UNITED STATES PATENT OFFICE.

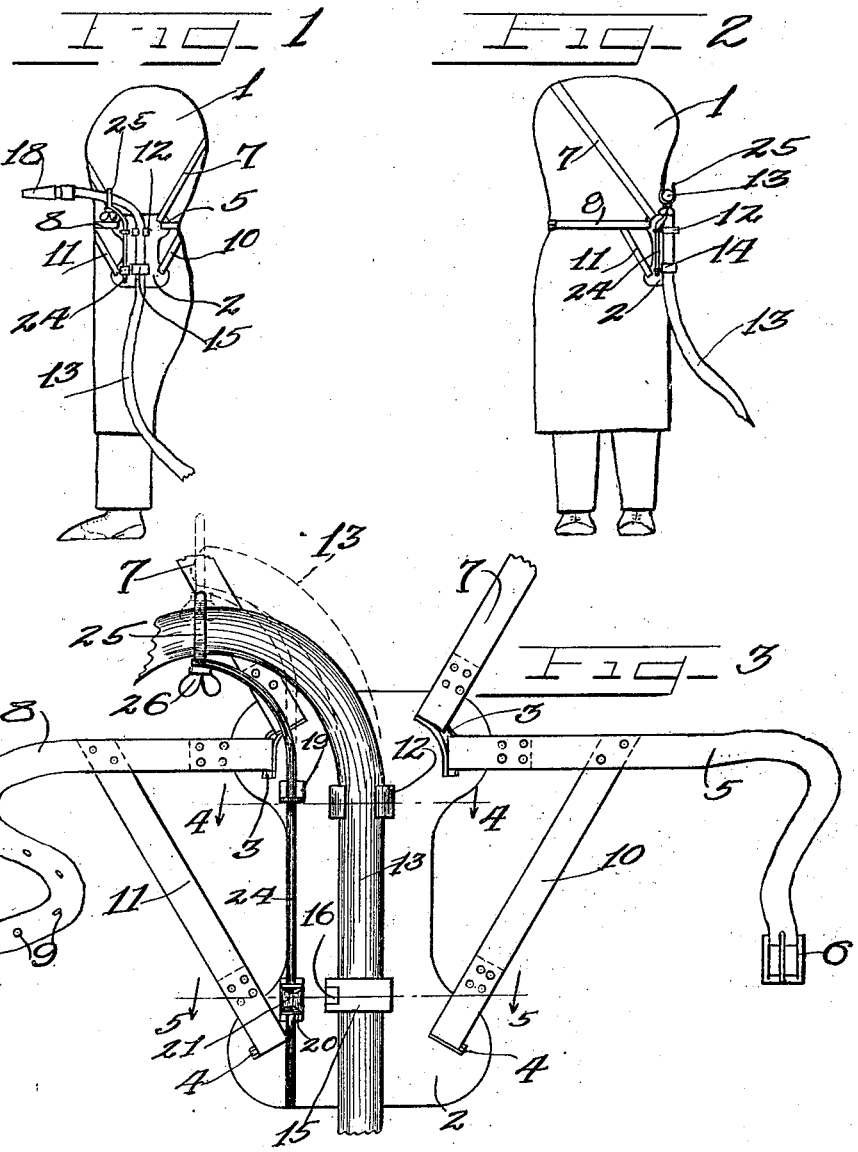

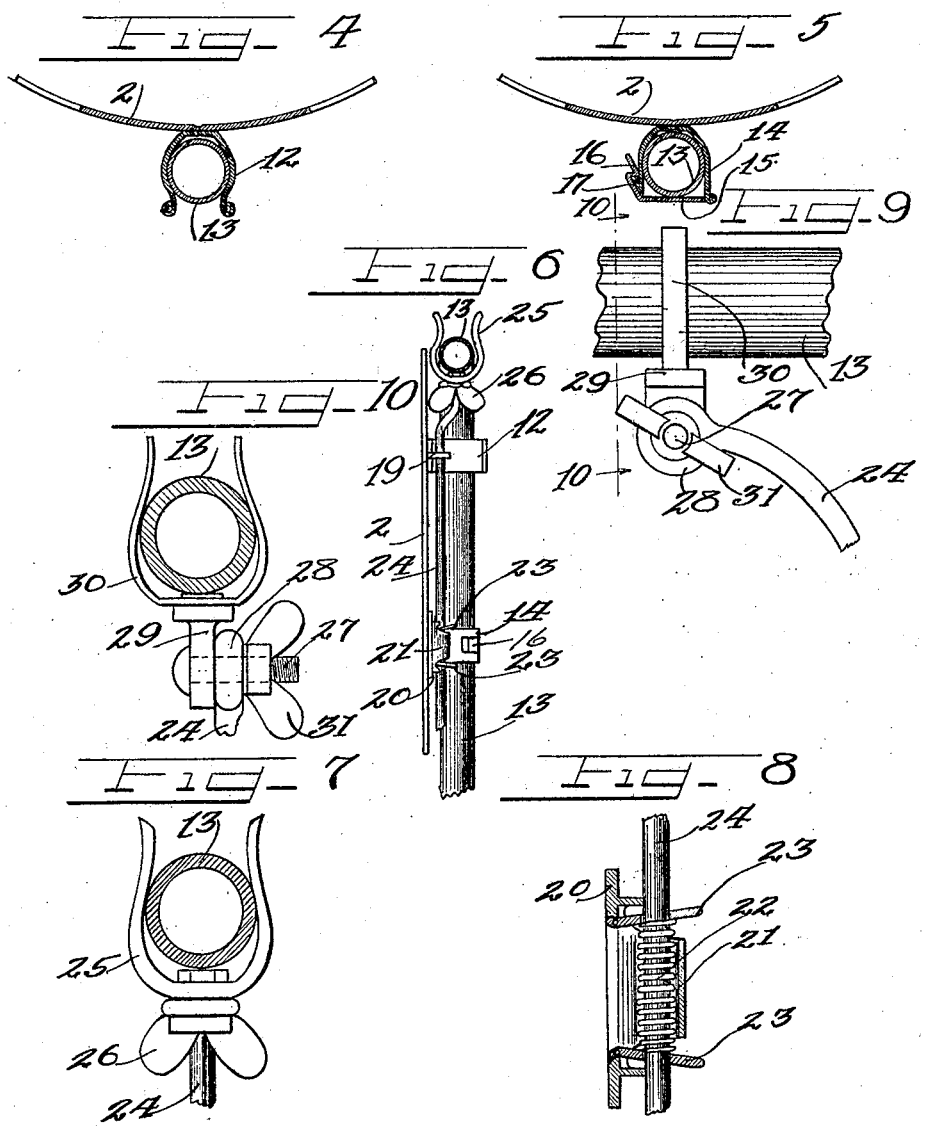

AUGUST P. SCHEIN, OF CHICAGO, ILLINOIS, ASSIGNOR OF ONE-HALF TO WILLIAM J. McGEE, OF CHICAGO, ILLINOIS.

HOSE SUPPORT.

1,405,164.  Specification of Letters Patent.  Patented Jan. 31, 1922.

Application filed October 2, 1919. Serial No. 327,943.

*To all whom it may concern:*

Be it known that I, AUGUST P. SCHEIN, a citizen of the United States, and a resident of the city of Chicago, in the county of Cook and State of Illinois, have invented certain new and useful Improvements in a Hose Support; and I do hereby declare that the following is a full, clear, and exact description of the same, reference being had to the accompanying drawings, and to the numerals of reference marked thereon, which form a part of this specification.

This invention relates more particularly to a support for the nozzle end of a garden or greenhouse hose, said support constructed to be removably attached to a person's body to permit the hose to be dragged along by the person's body thereby leaving the hands free to operate the nozzle and direct the stream of water issuing therefrom.

It is an object of this invention to provide a hose support adapted to be removably attached to a person.

It is also an object of the invention to provide a portable hose support adapted to be removably attached to a person to permit a length of hose to be dragged about by the person without the use of the person's hands.

Another object of the invention is the construction of a portable hose attachment wherein the nozzle end of a hose is adapted to be adjustably supported.

A further object of the invention is the construction of a hose support adapted to be removably strapped to a person to permit a hose length to be dragged along by the person, and leaving the person's hands free to operate the nozzle and properly direct the stream of water as the hose is being pulled along.

It is furthermore an object of this invention to provide a portable hose support adapted to be strapped in place to one side of a person's body and affording clamping members for holding the nozzle end of the hose secured in place so that the nozzle may be freely operated by the person's hands as the hose is pulled along by the person's body.

It is an important object of this invention to provide a simple and inexpensive hose support permitting a hose to be pulled along by a person's body leaving the hands free to manipulate the hose nozzle, thereby greatly facilitating sprinkling in greenhouses and gardens where particular care must be exercised in applying proper sprays or streams of water on plants.

Other and further important objects of this invention will be apparent from the disclosures in the specification and drawings.

The invention (in a preferred form) is illustrated in the drawings and hereinafter more fully described.

On the drawings:

Figure 1 is a side elevation of a person having a hose support embodying this invention removably secured in position.

Figure 2 is a front view of the person and showing the side of the device.

Figure 3 is an enlarged front elevation of the hose support with parts broken away and showing a hose clamped in position.

Figure 4 is a section taken on line 4—4, of Figure 3.

Figure 5 is a section taken on line 5—5, of Figure 3.

Figure 6 is a side elevation of the device showing the hose in section, and the straps omitted.

Figure 7 is an enlarged elevation of the clip support for the hose.

Figure 8 is a detail longitudinal section taken through the spring controlled rod support.

Figure 9 is a side elevation of a modified form of an adjustable clip support for the hose.

Figure 10 is a view taken on line 10—10, of Figure 9.

As shown on the drawings:

The reference numeral 1, indicates a person wearing a hose support embodying the principles of this invention and comprising a supporting or base plate 2, curved to conform and conveniently fit around one side or over one hip of a person. The plate may be made of metal or other suitable material and is provided with upper curved openings 3, and lower inclined openings 4. Engaged through one of the upper openings 3, is one end of a belt strap 5, on the other end of which a belt buckle 6, is secured. Also engaged through said same upper opening and secured on itself is one end of a shoulder strap 7, the other end of which is engaged through the second upper opening 3. Engaged through said second upper opening 3, and secured on itself is one end of a belt strap 8, the other end of which is provided with a plurality of apertures 9, and is adapted to be engaged in the belt buckle 6, in the customary manner. Engaged through one of the lower plate openings 4, is one end of a brace strap 10, the other end of which is secured to the belt section 5. A second brace strap 11, has one end attached to the belt section 8, and the other end engaged through the second lower plate opening 4, as clearly shown in Figure 3.

Rigidly secured near the upper central portion of the base plate 2, is a spring bracket or resilient hose holder 12, adapted to permit a hose 13, to be pressed into place between the spring arms thereof. Also rigidly secured on the base plate 2, below the holder 12, is a hose bracket or holder 14, having hingedly attached to one arm thereof a retaining or latch strap 15, the free end of which is bent to form a spring latch 16, adapted to removably engage behind a projection or head 17, formed at the outer end of the second arm of the hose bracket 14. The hose 13, is thus permitted to be engaged in the bracket 14, and locked therein by means of the latch strap 15.

A nozzle 18, is secured in place at the spraying end of the hose 13. The nozzle end of the hose is adjustably held supported in place, as shown in Figure 1, to permit convenient operation of the nozzle and directing of the escaping water spray by the operator's hands. Due to the novel arrangement of the hose support the hose is drawn or pulled along by the operator's body, leaving the hands free to adjust the nozzle and properly direct the spray. The adjustable supporting mechanism for the nozzle end of the hose embraces an apertured angle bracket 19, one flange of which is rigidly secured to the outer surface at one side of the base plate 2. Also secured on the base plate 2, below the angle bracket 19, is a spring controlled clamping mechanism comprising a back plate 20, having integrally formed thereon a longitudinally disposed casing 21, open at both ends and having a coil spring 22, engaged therein between a pair of pivoted apertured tongues or fingers 23. A supporting rod 24, projects through the apertured flange of the bracket 19, and through the pivoted tongues 23, and the coiled spring 22. The spring 22, normally acts to hold the pivoted tongues projected outwardly from one another to frictionally clamp the rod 24, and hold the same in an adjusted position, as shown in Figure 8. The upper end of the rod 24, is curved to form an elbow, on the end of which is rotatably mounted an oar-swivel or rowlock 25, provided with a wing-nut 26, for holding the rowlock 25, secured in an adjusted position, if so desired. The nozzle end of the hose 13, is removably engaged in the rowlock 25, thus holding the hose nozzle 18, in a convenient position projecting in front of the operator.

Figures 9 and 10, disclose a modified form of rowlock mechanism, comprising a bolt 27, which projects through a ring or eye 28, integrally formed on the end of the rod 24. Engaged on the bolt 27, to one side of the eye 28, is a stem or holder 29, having pivotally mounted thereon a rowlock or oar-swivel 30. Threaded on the threaded end of the bolt 27, is a wing-nut 31, for clamping the rowlock stem 29, in place. This construction provides an arrangement whereby the rowlock may be adjustably swung downwardly and upwardly, as desired.

The operation is as follows:

To mount the hose support in position on a person the shoulder strap is engaged over one shoulder and passes diagonally across the front and back of the person's body to the opposite side, to hold the base plate 2, suspended in position over one hip. The belt 5—8, is then secured around the person's waist, with the brace straps 10 and 11, holding the lower part of the base plate in place, as shown in Figures 1 and 2.

The hose 13, may now be engaged between the spring arms of the hose support 12, and in the support 14, the latch strap of which is then closed, as disclosed in Figure 5. The nozzle end of the hose 13, is seated or engaged in the rowlock 25, which is supported on the rod 24. The rod may be readily raised or lowered by simply moving the tongues 23, together to compress the spring 22, thereby positioning the apertures in the tongues co-axial with the rod 24, to permit the rod to slide downwardly or be pushed upwardly. The nozzle may thus be raised or lowered.

When the person moves about, the hose is dragged or pulled along by the person's body, leaving the hands and arms free to adjust the nozzle and properly direct the stream of water from the nozzle. This arrangement is very convenient in gardens and greenhouses, where the stream of water must be adjusted very frequently to apply either sharp needle streams or various fine sprays of water to different plants.

I am aware that numerous details of construction may be varied through a wide range without departing from the principles of this invention, and I therefore do not purpose limiting the patent granted otherwise than necessitated by the prior art.

I claim as my invention:

1. In a hose support, a hose clasping member consisting of two curved resilient members concave toward each other, a hose securing member consisting of a U-shaped member, a closure pivotally connected at one end thereof to one end of said member, and a locking device for securing the other end of said closure to the other end of said member, a hose receiving stirrup, supporting means common to said three elements, and means for attaching said supporting means to a person, said clasping member, securing member and stirrup being each of a size to co-operate with the same diameter of hose.

2. In a hose support, a base, means for securing said base to a person, two hose holding devices mounted on said base in a position to be substantially vertically one over the other when the device is thus secured, the lower one of said devices having means for locking a hose therein and the upper one having means for resiliently holding a hose.

3. In a hose support, a base, means for securing said base to a person, two hose holding devices mounted on said base in a position to be substantially vertically one over the other when the device is thus secured, the lower one of said devices having means for locking a hose therein and the upper one having means for resiliently holding a hose, a third hose holding device, and means for adjusting the position thereof relative to the other two.

In testimony whereof I have hereunto subscribed my name in the presence of two subscribing witnesses.

AUGUST P. SCHEIN.

Witnesses:
Le Roy D. Kiley,
Lawrence Reibstein.